United States Patent [19]
Bellmann

[11] 3,968,703
[45] July 13, 1976

[54] ENDLESS POWER TRANSMISSION BELT

[75] Inventor: Bernard R. Bellmann, Springfield, Mo.

[73] Assignee: Dayco Corporation, Dayton, Ohio

[22] Filed: Jan. 24, 1975

[21] Appl. No.: 543,837

[52] U.S. Cl. .................................. 74/231 C; 74/233
[51] Int. Cl.² ........................ F16G 1/28; F16G 5/20; F16G 5/08
[58] Field of Search .................. 74/231 C, 233, 234, 74/237, 231 R; 156/137, 139, 138

[56] References Cited
UNITED STATES PATENTS

| | | | |
|---|---|---|---|
| 2,430,024 | 11/1947 | Luaces et al. | 74/237 |
| 2,526,324 | 10/1950 | Bloomfield | 74/237 |
| 2,793,150 | 5/1957 | Deaves | 74/237 |
| 3,464,875 | 9/1969 | Brooks et al. | 74/233 |
| 3,523,462 | 8/1970 | Beindorf | 74/237 |
| 3,656,360 | 4/1972 | Fix | 74/237 |
| 3,772,929 | 11/1973 | Redmond, Jr. | 74/231 C |
| 3,835,720 | 9/1974 | Fisher et al. | 74/231 C |

Primary Examiner—Samuel Scott
Assistant Examiner—Allan R. Burke
Attorney, Agent, or Firm—Reuben Wolk

[57] ABSTRACT

An endless power transmission belt made primarily of elastomeric materials is provided and comprises a tension section, load-carrying means, and a compression section with at least one of the sections having a plurality of stiffening members extending the full width thereof with each of the stiffening members having a substantially flat non-circular cross sectional configuration which provides transverse rigidity for the belt yet enables the belt to be made with a minimum height perpendicular its outside and inside surfaces when viewing the belt in cross section and the minimum height enables the belt to operate at a lower temperature which extends the service life thereof.

16 Claims, 6 Drawing Figures

ENDLESS POWER TRANSMISSION BELT

BACKGROUND OF THE INVENTION

Endless power transmission belts made primarily of elastomeric materials and including toothed or so-called cog-type belts are in wide use throughout industry. A problem with all of such elastomeric endless belts is the provision of a belt which has sufficient transverse rigidity, i.e. transverse the endless path in which it operates, to prevent belt flopover or turnover, yet which enables the belt to be operated in sheaves or pulleys of minimum diameter.

Many belt constructions have been proposed heretofore for increasing the transverse rigidity of ordinary belts as well as toothed belts; however, these previously proposed constructions often result in a more expensive belt and one having a thickness greater than necessary. Each of these thicker belts is more difficult to operate in comparatively small diameter sheaves or pulleys and also results in the belt operating at elevated temperature which tends to promote delamination of the various belt sections and a reduced service life.

SUMMARY

This invention provides an improved endless power transmission belt, including an improved toothed belt, made primarily of elastomeric materials and which overcomes or minimizes the above-mentioned problem.

In particular, this invention provides an endless power transmission belt made primarily of elastomeric materials and comprises a tension section, load-carrying means, and a compression section with at least one of the sections having a plurality of stiffening members extending the full width thereof with each of the stiffening members having a substantially flat non-circular cross-sectional configuration which provides transverse rigidity for the belt yet enables the belt to be made of a minimum height perpendicular its outside and inside surfaces when viewing the belt in cross section and the minimum height enables the belt to operate at a lower temperature which extends the service life thereof.

Other details, uses, and advantages of this invention will be readily apparent from the exemplary embodiments thereof presented in the following specification, claims, and drawing.

BRIEF DESCRIPTION OF THE DRAWING

The accompaning drawing shows present exemplary embodiments of this invention, in which.

DESCRIPTION OF ILLUSTRATED EMBODIMENTS

Figure 1:
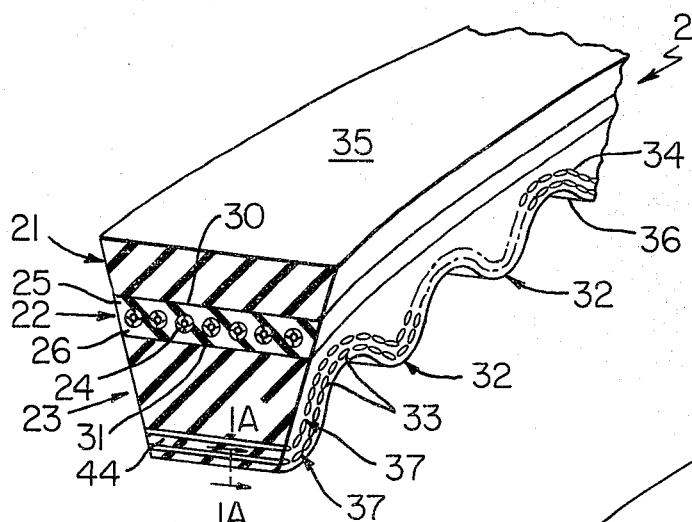
FIG. 1 is a fragmentary prospective view with parts in cross section and parts in elevation illustrating one exemplary embodiment of an endless power transmission belt of this invention in the form of a toothed belt.

Reference is now made to FIG. 1 of the drawings which illustrates one exemplary embodiment of an endless power transmission belt of this invention which is designated generally by the reference numeral 20 and such belt is made primarily of elastomeric materials and is particularly adapted to be operated in an endless path in accordance with techniques known in the art. The belt 20 is in the form of a toothed or so-called cog-type belt and comprises a tension section 21, load-carrying means which will also be referred to as a load-carrying section 22, and a compression section 23. The load-carrying section has a helically wound load-carrying cord 24 and includes a pair of layers 25 and 26 arranged on opposite sides of and being bonded to the load-carrying cord 24 in accordance with known techniques with the layer 25 being bonded to tension layer 21 at a common interface 30 and the layer 26 being bonded to the compression section 23 at a common interface 31 thereof.

Figure 1A:
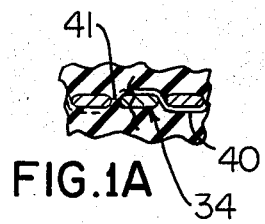
FIG. 1A is an enlarged fragmentary cross-sectional view taken essentially on the line 1A—1A of FIG. 1.

The compression section 23 has a plurality of teeth each designated generally by the reference numeral 32 which are arranged transverse the endless path of the belt and hence transverse the longitudinal axis of such belt as viewed in cross section and each of the teeth has a plurality of stiffening members 33 extending the full width thereof with each of the stiffening members having a substantially flat noncircular cross sectional configuration as illustrated at 34 in FIGS. 1 and 1A. The stiffening members 33 provide transverse rigidity for the toothed belt 20 and yet enable such belt to be made of minimum height perpendicular its outside and inside surfaces 35 and 36 respectively when viewing the belt in cross section. The minimum height of the belt 20 also enables such belt to operate at a lower temperature which serves to extend the service life of such belt.

The stiffening members 33 of the belt 20 are arranged in parallel relation in at least one layer along the endless path of the belt 20 and, in this example the members 33 are arranged in a plurality of two layers each of which is designated by the same reference numeral 37.

As will be apparent particularly from FIG. 1A of the drawing, the members 33 in each layer 37 are held interconnected by comparatively weak tie bands or fibrous strands 40 which extend substantially parallel the endless path of the belt 20 and hence extend substantially perpendicular to the members 33. The members in each layer 37 are closely spaced together and define in excess of generally 50% of the material of the associated layer with the remainder of the material being defined by elastomeric material arranged between the members as illustrated at 41. In particular, such elastomeric material in this example is indicated in the drawing by cross-hatching as being a suitable rubber compound.

Figure 2:
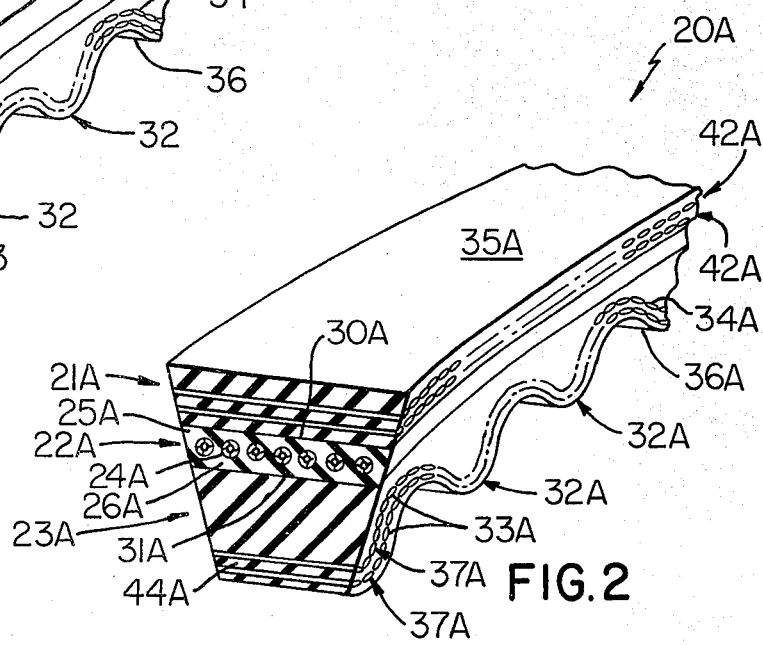
FIG. 2 is a view similar to FIG. 1 illustrating another exemplary embodiment of a toothed endless power transmission belt of this invention.

Another exemplary embodiment of a toothed or cog-type belt of this invention is illustrated in FIG. 2 of the drawing. The belt illustrated in FIG. 2 is very similar to the belt 20; therefore, such belt will be designated generally by the reference numeral 20A and parts of the belt 20A which are very similar to corresponding parts of the belt 20 will be designated by the same reference numeral as in the belt 20 also followed by the letter designation A and not described again. Only those component parts of the belt 20A which are different from corresponding parts of the belt 20 will be designated by a new reference numeral also followed by the letter designation A and described in detail.

In a similar manner as the belt 20, the belt 20A has a tension section 21A, a load-carrying section 22A comprised of helically wound load-carrying cord 24A and layers 25A and 26A, and a toothed compression section 23A. The toothed compression section 23A has teeth 32A and a plurality of two layers 37A which are substantially identical to the layers 37 in the compression section 23 of the belt 20.

In addition, it will be seen that the belt 20A has a plurality of two layers each designated by the same reference numeral 42A in the tension section 21A. Each of the layers 42A is substantially identical to layers 37 and 37A and is comprised of stiffening members 33A held together by weak tie bands 41A and in a similar manner as the members 33A and tie bands 41A in the layers 37A of the compression section 23A.

The layers 42A serve to further increase the transverse rigidity of the belt and in particular serve to stiffen and strengthen the transverse rigidity of the tension section 21A of belt 20A. Further, by providing layers 42A and 37A in the tension section and in the toothed compression section respectively the overall thickness of the belt between surfaces 35A and 36A thereof may be reduced even more than if such layers were to be provided in only one of such sections. Also, by providing stiffening members 33A in the layers 42A and 37A the belt 20A can operate in associated sheaves with even less frictional contact between its opposed nonparallel surfaces or sides and associated walls of the sheaves.

Each of the belts 20 and 20A may be made utilizing any technique known in the art. However, preferably each of such belts is made by wrapping the material forming the compression section 23 and 23A around a corrugated mandrel and in a similar manner as disclosed in U.S. Pat. No. 3,464,875, and completing each belt 20 or 20A as disclosed in this patent.

Figure 3:
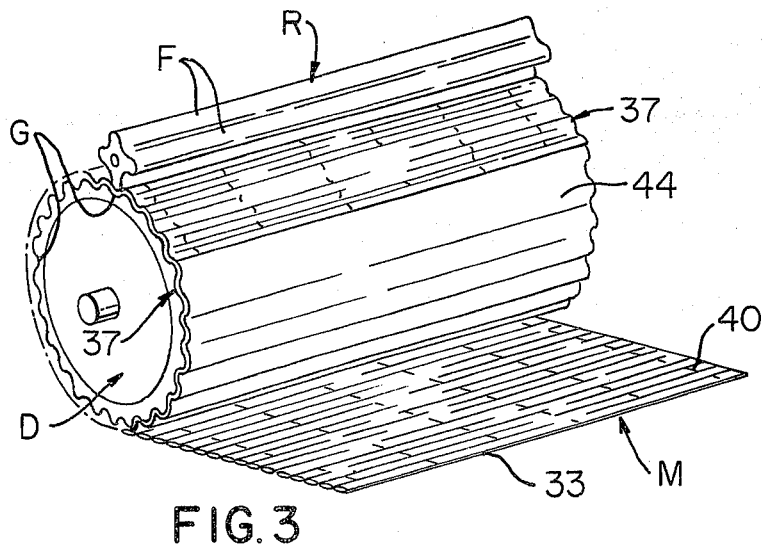
FIG. 3 is a perspective view particularly illustrating a method step which may be employed to make the belts of FIG. 1 and FIG. 2.

Considering the belt 20, for example, one of the steps of making the belt 20 is the unwinding of a roll of material designated generally by the reference numeral M in FIG. 3 and with the material M being comprised of the stiffening members 33 held together by the comparatively weak tie bands 40 in the manner previously described. The material M is unwound from a supply roll thereof (not shown) and wrapped around a drum D of known construction with the drum having projections and undulations therein which define grooves G therein and the contour of the teeth 32 of the compression section 23.

Concurrently with the wrapping of the material M around the drum D a stitching roll R is mounted adjacent the drum D and is rotated opposite the direction of rotation of the drum D. The roll R forces the material M into the grooves G of such drum and it will be seen that the roll R has a plurality of flutes F which mesh with the grooves G of the drum D and thereby assure forcing the material M into the grooves G.

Considering the illustration of FIG. 3 for the belt 20, it will be seen that a layer of material M is first wrapped around the drum D to define a layer 37 which in the final belt is closely adjacent the surface 36. A layer 44 (also see FIG. 1) made of the same rubber compound used to define the remainder of the compression section is then wound around the first layer 37 whereupon another layer of material M is wound in position to define the layer 37 arranged closely adjacent the load-carrying section 22. The remainder of the compression section 23 and the entire belt may be defined essentially as described in the above-mentioned patent. As previously suggested, the belt 20A may be similarly defined.

Figure 4:
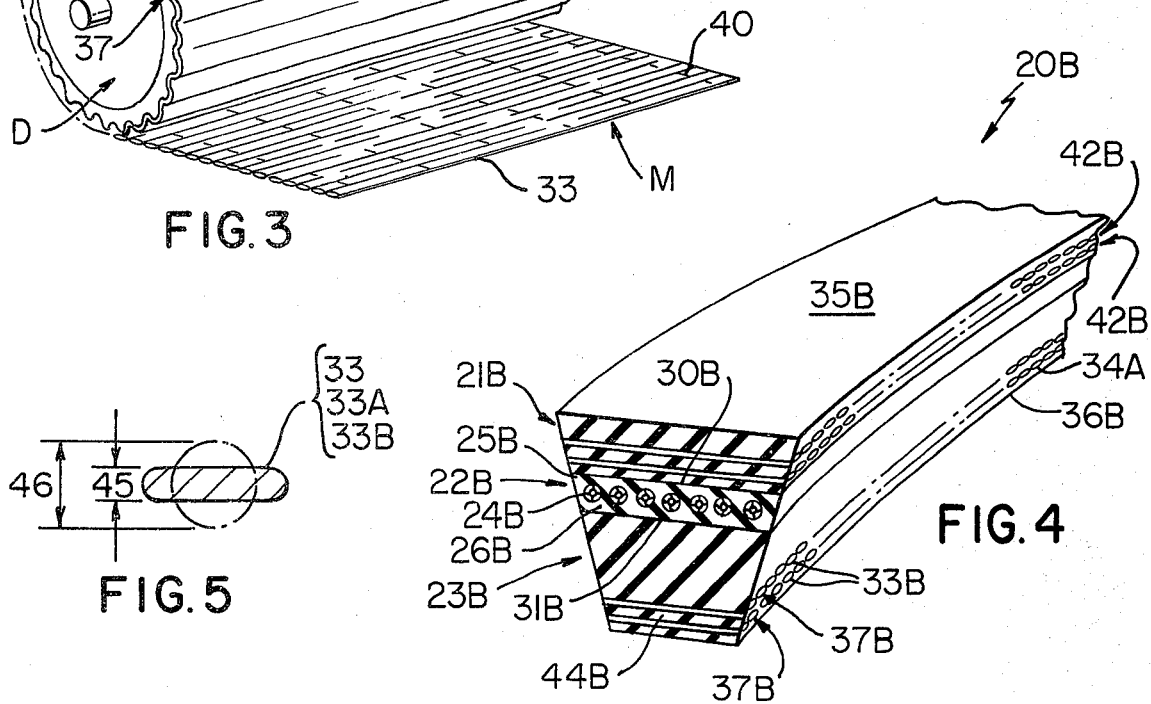
FIG. 4 is a view similar to FIG. 1 illustrating another exemplary embodiment of the belt of this invention.

Another exemplary embodiment of this invention is illustrated in FIG. 4 of the drawing. The belt illustrated is FIG. 4 is very similar to the belt 20A; therefore, such belt will be designated generally by the reference numeral 20B and parts of the belt 20B which are similar to corresponding parts of the belt 20A will be designated by the same reference numeral as in the belt 20A also followed by the letter designation B and not described again. The main difference between the belt 20A and the belt 20B is that the belt 20B instead of being in the form of a toothed belt is in the form of a regular or plain V-belt of trapezoidal outline having an outside surface 35B and an inside surface 36B which is arranged parallel thereto, as viewed in cross section, and is of uniform cross-sectional outline throughout its endless path.

The belt 20B has a tension section 21B, a load-carrying section 22B comprised of a load-carrying cord 24B and layers 25B and 26B, and a compression section 23B. In addition, it will be seen that the belt 20B has layers 37B in its compression section 23B and 42B in its tension section 21B whereby the belt 20B has optimum transverse rigidity yet such belt has a minimum height or thickness perpendicular to its opposed parallel surfaces 35B and 36B.

As in the case of the belts 20A and 20, the belt 20B has a minimum thickness because it employs substantially flat non-circular stiffening members 33B which have rounded edges, thus providing a substantially elliptical cross-sectional configuration. Accordingly, the belt 20B has a thickness which is generally much less than the thickness of ordinary trapezoidal V-belts proposed heretofore. As in the case of the belts 20 and 20A, the belt 20B in addition to its above-mentioned optimum transverse rigidity is capable of being operated in comparatively small diameter sheaves and also operates at lower operating temperatures whereby it has an extended service life.

Figure 5:
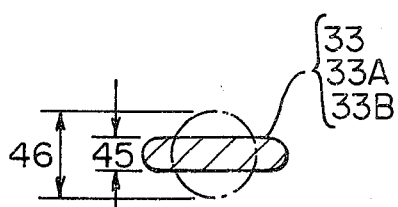
FIG. 5 is a view particularly illustrating the crosssectional configuration of a typical flat substantially elliptical stiffening member comprising the belts of FIGS. 1, 2, and 4 as compared with a stiffening member of circular cross-sectional configuration.

Reference is now made to FIG. 5 of the drawing which illustrates a typical member 33, 33A, or 33B which is incorporated in an associated belt 20, 20A, or 20B. This figure emphasizes that such typical member is flat with rounded edges, thus providing a substantially elliptical cross-sectional configuration which has a height indicated at 45 which is roughly two-thirds the height or diameter 46 of a circular member, shown by the dot-dash lines, which provides approximately the same cross-sectional area and such circular member would be useful in providing roughly the same transverse rigidity in an associated belt as a member 33, 33A, or 33B.

Any suitable elastomeric material may be used to make the various component sections or layers of each of the belts 20, 20A, and 20B disclosed herein; and, it will be appreciated that natural and synthetic rubber compounds may be used as well as suitable plastic materials.

Each of the load-carrying cords 24, 24A, and 24B disclosed herein may be made of any suitable material used in the art including but not being limited to materials such as nylon, rayon, polyester, fiberglass, and the like.

The belts 20, 20A, and 20B are shown in this disclosure as so-called raw-edged belts wherein woven covers, or the like, are not provided on the outside and inside surfaces thereof. However, it will be appreciated that, if desired, suitable covers may be provided on the outside and inside surfaces in accordance with techniques known in the art.

The stiffening members have been shown herein and described as being made of a non-metallic material and the cross-hatching thereof is shown as a general cross-hatching to indicate that any material may be employed. It will be appreciated that any suitable material may be used to make the stiffening members 33, 33A, and 33B including but not limited to nylon, fiberglass, and the like.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt having outside and inside surfaces made primarily of elastomeric materials and being adapted to be operated in an endless path, said belt comprising, a tension section, load-carrying means, and a compression section, at least one of said sections having a plurality of stiffening members extending the full width thereof, each of said members having a substantially flat non-circular cross-sectional configuration which provides transverse rigidity for said belt yet enables said belt to be made of minimum height perpendicular its outside and inside surfaces when viewing said belt in cross section, said minimum height enabling said belt to operate at a lower temperature which extends the service life thereof, said members being arranged in at least one layer along said endless path and in parallel relationship, said members being held in interconnected by comparatively weak tie bands extending substantially parallel to said endless path.

2. A belt as set forth in claim 1 in which the other of said sections also has a plurality of stiffening members extending the full width thereof.

3. A belt as set forth in claim 1 in which said members are flat and have rounded edges.

4. A belt as set forth in claim 3 in which each of said members is made of a non-metallic material.

5. A belt as set forth in claim 1 in which said members of said one layer are closely spaced together and define in excess of generally 50% of the material in the one layer with the remainder of the layer being defined by elastomeric material arranged between said members.

6. A belt as set forth in claim 1 in which said load-carrying means comprises a helically wound load-carrying cord made of a substantially inextensible material.

7. A belt as set forth in claim 3 in which said members have roughly two-thirds the height of a circular member providing approximately the same cross-sectional area.

8. A belt as set forth in claim 1 and having a substantially trapezoidal cross-sectional configuration of substantially uniform area at each location along its endless path.

9. A belt as set forth in claim 1 in which the other of said sections also has a plurality of stiffening members extending the full width thereof, all of said stiffening members being flat with rounded edges and made of a non-metallic high strength material.

10. An endless power transmission belt having outside and inside surfaces made primarily of elastomeric materials and being adapted to be operated in an endless path, said belt comprising, a tension section, load-carrying means, and a compression section having a plurality of teeth arranged transverse said endless path, each of said teeth having a plurality of stiffening members extending the full width thereof with each of said members having a substantially flat non-circular cross-sectional configuration which provides transverse rigidity for said belt yet enables said belt to be made of minimum height perpendicular to its outside and inside surfaces when viewing said belt in cross section, said minimum height enabling said belt to operate at a lower temperature which extends the service life thereof, the members in each of said sections being arranged in at least one layer along said endless path and in parallel relationship, said members being held interconnected by comparatively weak tie bands extending substantially parallel to said endless path.

11. A belt as set forth in claim 10 in which said tension section also has a plurality of stiffening members extending the full width thereof.

12. A belt as set forth in claim 10 in which said members are flat with rounded edges.

13. A belt as set forth in claim 12 in which each of said members is made of a non-metallic material.

14. A belt as set forth in claim 10 in which said members in each layer are closely spaced together and define in excess of generally 50% of the material in the associated layer with the remainder of the layer being defined by rubber material arranged between its associated members.

15. A belt as set forth in claim 14 in which said load-carrying means comprises a helically wound load-carrying cord made of a substantially inextensible material.

16. A belt as set forth in claim 10 in which said members have roughly two-thirds the height of a circular member providing approximately the same cross-sectional area.

* * * * *